Nov. 5, 1968 H. P. MEHR 3,409,228
EJECTOR NOZZLE
Filed Feb. 10, 1966
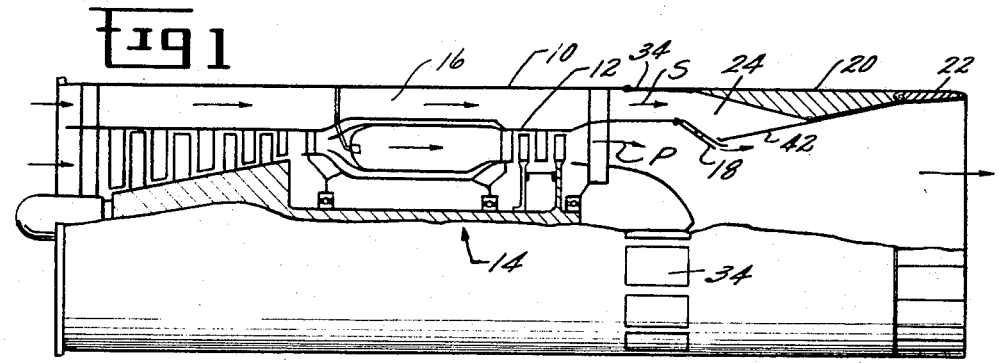
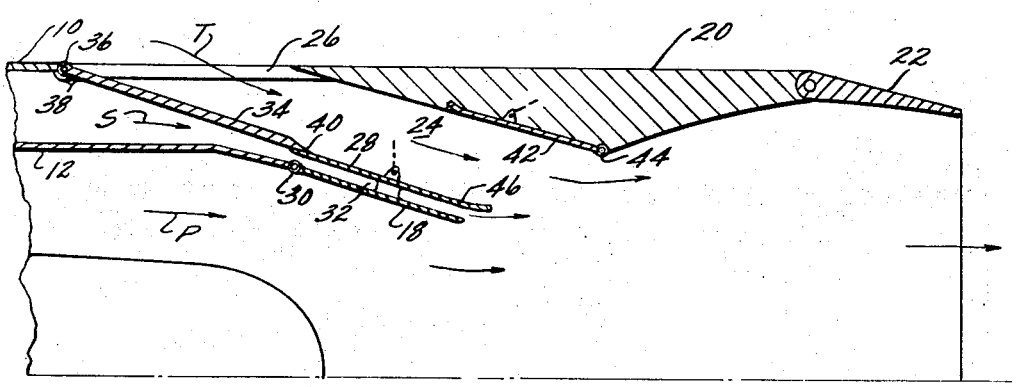
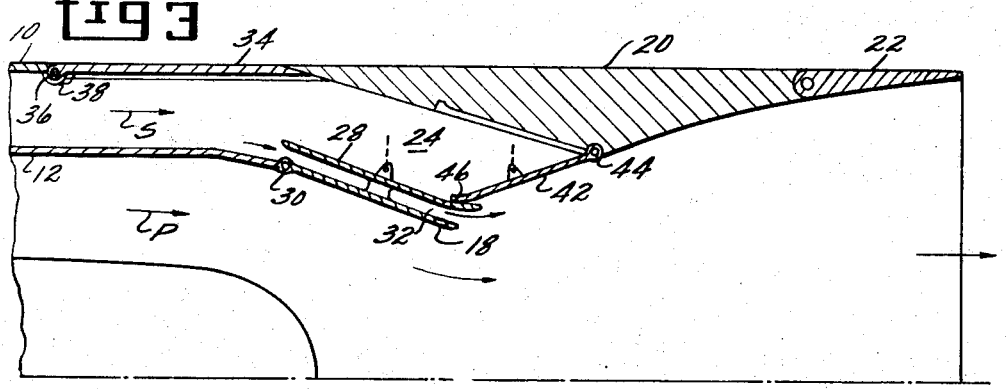
INVENTOR.
HANS P. MEHR
BY
ATTORNEY

United States Patent Office 3,409,228
Patented Nov. 5, 1968

3,409,228
EJECTOR NOZZLE
Hans P. Mehr, Mason, Ohio, assignor to General Electric Company, a corporation of New York
Filed Feb. 10, 1966, Ser. No. 526,420
8 Claims. (Cl. 239—127.3)

The invention described and claimed in the United States patent application herein resulted from work done under United States Government contract FA–SS–65–17. The United States Government has an irrevocable, non-exclusive license under said application to practice and have practiced the invention claimed herein, including the unlimited right to sublicense others to practice and have practiced the claimed invention for any purpose whatsoever.

The present invention relates to an ejector nozzle and, more particularly, to a tertiary inlet ejector nozzle for a reaction engine.

In present generation high Mach jet engines large nozzle variation is required in order to handle the expansion that occurs at supersonic velocity. This has necessitated nozzles of the long variable finger type with rugged actuation systems and relatively heavy and complex hardware for operating the nozzle efficiently at both subsonic and supersonic velocities. Additionally, the engine must be adequately cooled both on the ground and at high velocities. For this purpose, the so-called ejector nozzle has been designed which is merely a nozzle for injecting cooling flow over the engine. Normally, this flow comes through the aircraft inlet and then passes over the engine to the nozzle. However, during ground operation and low Mach number flight conditions, due to inlet losses, the pressure is reduced substantially by the time it gets to the compressor requiring the nozzle to pump from a pressure significantly lower than ambient to ambient pressure. This has proven difficult and, to overcome the difficulty at these conditions, air is bled in near the compressor exit through openings in the side of the nacelle in order to have the ejector easily pump from a point close to the ejector structure. These openings are normally referred to as ground cooling doors and they are either actuated closed or spring loaded in such a way that they float closed under increased pressure at high Mach numbers. Additionally, the side inlet air is desired to fill up the exhaust area of the nozzle at low Mach numbers. Thus, in such engines, it is desired to have means for inducing cooling flow over the engine at low flight speeds or during operation on the ground. Additionally, it is desired to have a nozzle through which additional air may be admitted during low speeds to prevent over-expansion and inefficient nozzle operation. With large quantities of air being passed through the nozzle, less variation in exit area is required for optimum nozzle performance and this is a design simplification. However, in most aircraft installations, it is impossible to pass large quantities of air over the engine and for this reason it is sometimes desirable to add an additional inlet area to the nozzle.

The primary object of the present invention is to provide a tertiary inlet ejector nozzle which also acts to pump cooling flow over the engine at all conditions of operation.

Another object is to provide a nozzle that avoids the use of long and heavy hardware and the complex actuation mechanism that goes with it.

A further object is to provide such a nozzle which is an ejector nozzle using a novel structure that ensures the pumping of engine cooling air at all the desired conditions of operation.

Another object is to provide such a nozzle wherein the ejector geometry is substantially constant for a wide variation of nozzle area.

A final object is to provide such a nozzle wherein the ejector mechanism is short and thus permits shorter engine nozzle structure.

Briefly stated, there is provided a tertiary inlet ejector nozzle for any kind of a reaction engine having a gaseous exhaust, such as a jet engine, and which has spaced outer and inner casings to form a cooling passage around the engine. A plurality of peripherally disposed primary nozzle flaps are pivotally connected to the inner casing at the downstream end to form a variable area nozzle for the primary engine exhaust flow. There is provided a fixed nozzle portion that is spaced downstream of the outer casing and may be supported from that casing, the spacing forming a peripheral inlet around the casing which connects with ambient and to the primary flow downstream of the primary flaps. Pumping action is obtained by provision of an ejector flap that is concentric with and spaced outwardly of the primary flaps and supported on the flaps forming, in effect, a double walled flap or an annulus around the primary flap. A ramp flap means is provided peripherally around the inlet and preferably pivotally secured to the downstream end of the outer casing. These ramp flaps are operable to open inwardly across the cooling passage and they substantially contact the forward end of the ejector flaps when they are open. The ejector flap may be longer than its primary flap and be curved parallel to the longitudinal centerline for better flow. The whole nozzle preferably is a converging-diverging nozzle of the tertiary inlet type where the fixed portion forms a continuous outer surface with the outer casing for ideal external flow characteristics. Optionally, fingers may be pivotally supported at the downstream end on the fixed nozzle portion, to improve the internal performance of the nozzle at subsonic conditions. In addition, pivotal fingers may be supported near the upstream end at the fixed nozzle portion to provide guided flow expansion at high Mach number flight conditions where the tertiary inlet is closed.

While the specification concludes with claims particularly pointing out and distinctly claiming the subject matter which is regarded as the invention, it is believed the invention will be better understood from the following description taken in connection with the accompanying drawing, in which:

FIGURE 1 is a general diagrammatic view of a typical gas turbine engine to which the invention may be applied;

FIGURE 2 is a partial cross sectional view of the ejector nozzle structure at low subsonic flight conditions; and FIGURE 3 is a view, similar to FIGURE 2, showing the nozzle in the position for supersonic flight conditions.

The invention will be described in connection with a jet engine for ease of illustration. However, it is applicable to many kinds of reaction engines having a gaseous exhaust for propulsion. It will also be apparent that the exhaust nozzles may be variable or fixed throat and exit area types.

Referring first to FIGURE 1, there is shown a general diagrammatic view of an engine powerplant housed in an outer casing 10. Spaced from the outer casing is an inner casing 12 which houses a jet engine 14 of any conventional type. The spacing of the outer and inner casings 10 and 12 forms a cooling flow passage 16 around engine 14. This cooling passage is provided for the pumping of air around the engine to cool the inner engine 14 at all operating conditions. In order to obtain thrust and engine control a nozzle 18 is provided on the engine and it may be a fixed nozzle or it may consist of a plurality of peripherally disposed primary nozzle flaps that are pivotally connected to the inner casing at the downstream end as shown. Such structure is conventional and operates in the normal fashion by conventional actuating structure. In order to provide controlled expansion at supersonic velocities, it is necessary to provide a convergent-divergent nozzle and, to this end, variable secondary flaps that are well-known may be provided. The fixed nozzle portion is designed with its inner surface as shown so that at supersonic velocities, it provides, in combination with nozzle 18, a converging-diverging controlled flow nozzle.

Because of the fixed portion of nozzle 20 it will be apparent that it also provides a continuous coplanar outer surface with the outercasing 10 for efficient high speed operation, i.e., there is no tendency for boattail drag since it is a continuous flat surface permitting smooth airflow thereover.

With the fixed nozzle portion 20 being unable to close down and reduce the nozzle exit area, it is desirable at low flight Mach numbers to introduce high quantities of air to avoid overexpansion and inefficient nozzle operation. To this end, there is provided a tertiary inlet 24 which is substantially peripherally disposed around the outer casing and connects with ambient and the primary flow downstream of nozzle 18 as shown.

Referring next to FIGURE 2, the detail in the nozzle area may be seen more clearly. It will be seen that it is convenient to support the fixed nozzle portion 20 directly from the outer casing 10 by means of struts 26 to provide the peripheral inlet 24 which may extend completely around the engine interrupted only by the struts or may be discontinuous in order to avoid sucking in debris during ground operation. It will be seen that the primary exhaust flow through the engine is shown by the arrow P, the secondary or cooling flow through cooling passage 16 is shown by the arrow S, and the tertiary or fill-in flow from outside the engine into the primary flow through the inlet 24 is shown by the arrow T.

In order to provide a substantially constant ejector pumping action for pumping of cooling fluid over the engine at all conditions of operation, there is provided an ejector flap that if a round nozzle is used, is preferably concentric with and spaced outwardly of the primary flap on nozzle 18. As described and as shown in FIGURE 2, the primary flaps are indicated at numeral 18 and are intended to be pivoted at 30 from the inner casing and suitably actuated by known conventional means. Thus, ejector flap 28 and nozzle flap 18 form, in effect, a dual walled flap. The annulus gap 32 is formed between flaps 18 and 28, and may be maintained at any value desired and is substantially constant during all conditions of operation since ejector flap 28 moves with and is carried by flap 18. Furthermore, it will be apparent that ejector flap 28 may be quite short and of lightweight sheet metal construction.

During low Mach operation, such as may occur during ground operation or normal dry or even reheat operation, it is necessary to provide additional mass or airflow in the nozzle to prevent overexpansion and inefficient nozzle operation. Additionally, it is necessary to cool the engine upstream by pumping airflow through cooling passage 16. In order to provide the additional mass necessary, the tertiary inlet 24 is provided with ramp flap means 34 that may be conveniently pivoted at the upstream end at 36 and biased inward by any suitable means such as spring 38 so that is assumes an open position at the low pressure operating conditions and connects the ambient air through the inlet 24 to the primary flow downstream of the flaps 18. Ramp flaps 34 are biased inwardly to contact ejector flaps 28 at the upstream end 40 as shown in FIGURE 2. It will be apparent that the main or primary flow through the engine creates an ejector action through annulus gap 32 to pump secondary cooling flow through passage 16. Also, it will be apparent that the additional tertiary flow through the engine creates an ejector action through annulus gap 32 to pump secondary cooling flow through passage 16. Also, it will be apparent that the additional tertiary flow through inlet 24 prevents overexpansion at the lower speeds.

At high supersonic velocities, the nozzle assumes the position shown in FIGURE 3. In this position, as the pressure in the secondary or cooling flow passage 16 builds up, the ramp flaps 34 will be forced into the closed position shown to form a continuous coplanar surface with the outer edge of fixed nozzle portion 20 and the outer casing 10. The ram air effect, in conjunction with the ejector action by the ejector flap 28, provides a cooling flow around the engine.

For additional control of the secondary flow to the nozzle and guided expansion at the primary flow, there may be provided peripheral fingers 42 that may be conveniently pivoted at their downstream ends at 44 to the fixed nozzle portion 20. This additionally controls the amount of secondary cooling flow and pressure as will be apparent by its position across the inlet 24. It may or may not be desirable to have it contact ejector flap 28 depending on the cooling flow or pressure desired. If a small cooling flow is desired it may contact the end of flap 28 whereas, if more flow is desired it may be spaced somewhat from the end of flap 28 depending on the inlet pressure available.

It will be apparent that the parts may be cylindrical in a conventional fashion but are not limited to cylindrical configurations. The short ejector flap added to the primary nozzle offers an easy lightweight solution to the pumping problem associated with the tertiary inlet nozzle. By being supported on and riding with the primary nozzle, when the nozzle is variable, the ejector flap is also variable. Conveniently, to control the gap, the ejector flap may be larger than the primary flap and the downstream end may be curved or turned at 46 to be substantially parallel with the longitudinal centerline of the engine and reduce any discontinuities in the supersonic flow. The provision of the ejector flap thus solves the problem of low speed pumping of cooling flow by providing a constant ejector action with a short lightweight structural addition and provides similar cooling at high speed operation when the tertiary inlet is closed.

While there has been described a preferred form of the invention, obvious equivalent variations are possible in light of the above teachings. It is therefore to be understood that within the scope of the appended claims, the invention may be practiced otherwise than as specifically described, and the claims are intended to cover such equivalent variations.

I claim:

1. A tertiary inlet ejector nozzle for a reaction engine having spaced outer and inner casings forming a cooling flow passage around the engine,
   a converging member connected to the inner casing to form a nozzle for the primary gas flow,
   a fixed nozzle portion spaced downstream to form an inlet around said outer casing to said primary flow,
   an ejector flap spaced substantially parallel with and supported on said converging member outwardly thereof, and
   a ramp means operable to open inwardly of said cooling passage,
   said ramp means substantially contacting the forward end of said ejector in said open position.

2. Apparatus as described in claim 1 wherein said nozzle is converging and said fixed nozzle portion is diverging.

3. Apparatus as described in claim 2 wherein said fixed nozzle portion is supported from said outer casing and forms a continuous coplanar outer surface therewith.

4. Apparatus as described in claim 3 having fingers supported on said fixed nozzle portion and movable to control the inlet entrance of said cooling flow to said primary flow.

5. A tertiary inlet ejector nozzle for a jet engine having spaced outer and inner casings forming a cooling flow passage around the engine,
   a plurality of peripherally disposed primary nozzle flaps pivotally connected to the inner casing at the downstream end thereof to form a variable area nozzle for the primary gas flow, a fixed nozzle portion supported from and spaced downstream of said outer casing to form a substantially peripheral inlet around the outer casing to said primary flow downstream of said primary flaps, an ejector flap concentric with and spaced outwardly of said primary flaps and supported thereon to form an annulus, ramp flap means peripherally disposed and pivotally secured to the downstream end of said outer casing and operable to open inwardly across said cooling passage, said ramp means contacting the forward end of said ejector flaps in open position.

6. Apparatus as described in claim 5 wherein each ejector flap is longer than its primary flap and the downstream end of the ejector flap is substantially parallel to the longitudinal centerline.

7. Apparatus as described in claim 6 wherein said fixed nozzle portion forms a continuous coplanar outer surface with said outer casing.

8. Apparatus as described in claim 7 having peripherally disposed fingers pivotally supported at their downstream ends of said fixed portion and movable to control the inlet entrance of said cooling flow to said primary flow.

References Cited

UNITED STATES PATENTS

| | | | |
|---|---|---|---|
| 3,057,150 | 10/1962 | Hogan | 239—127.3 |
| 3,062,003 | 11/1962 | Hamilton | 239—127.3 |
| 3,262,264 | 7/1966 | Gardiner et al. | 239—127.3 |

EVERETT W. KIRBY, *Primary Examiner.*

UNITED STATES PATENT OFFICE
CERTIFICATE OF CORRECTION

Patent No. 3,409,228 November 5, 1968

Hans P. Mehr

It is certified that error appears in the above identified patent and that said Letters Patent are hereby corrected as shown below:

Column 6, line 8, "of" should read -- on --.

Signed and sealed this 10th day of March 1970.

(SEAL)
Attest:

Edward M. Fletcher, Jr.

Attesting Officer

WILLIAM E. SCHUYLER, JR.

Commissioner of Patents